March 4, 1924.  
A. U. ALCOCK  
1,485,755  
ELECTRIC PROCESS FOR THAWING CARCASSES OF FROZEN MEAT AND THE LIKE  
Filed May 13, 1919  2 Sheets-Sheet 1

INVENTOR  
Alfred U. Alcock  
BY  
his ATTORNEY

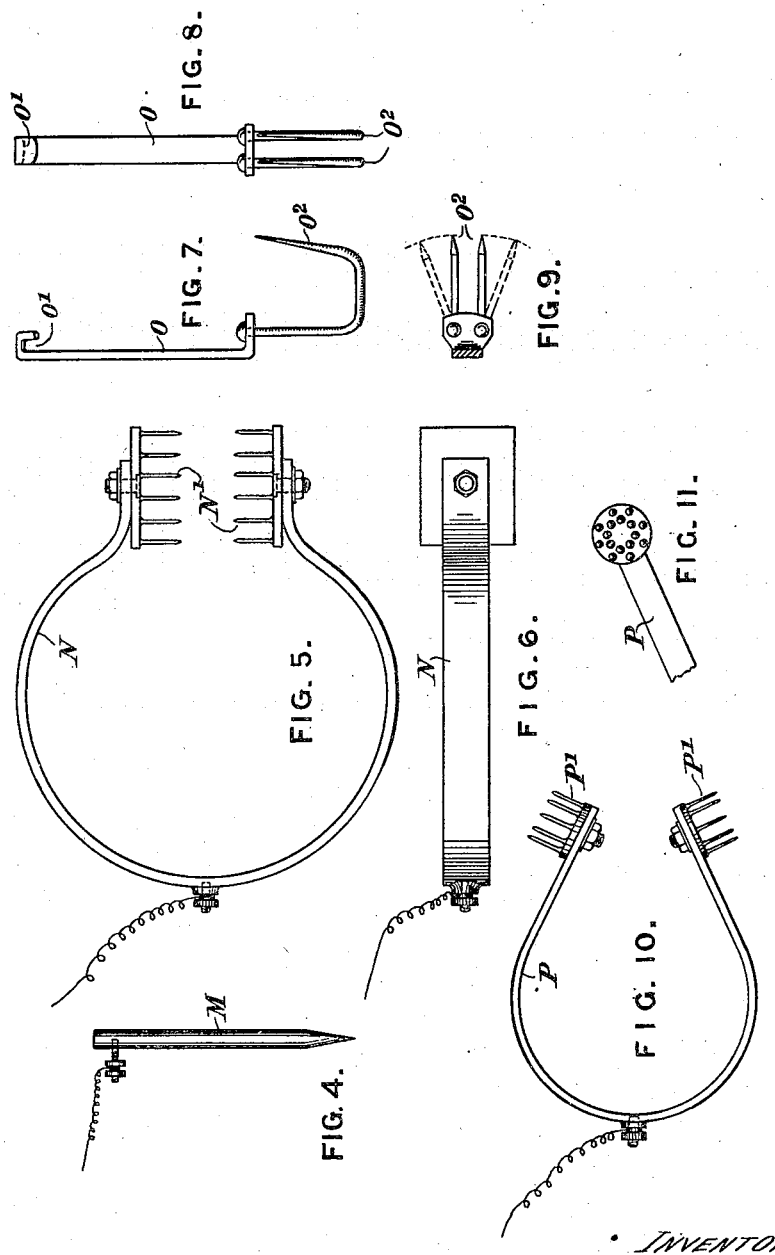

Patented Mar. 4, 1924.

1,485,755

UNITED STATES PATENT OFFICE.

ALFRED UPTON ALCOCK, OF MELBOURNE, VICTORIA, AUSTRALIA, ASSIGNOR OF ONE-HALF TO HARRY JAMES WAGSTAFF, OF SOUTH YARRA, VICTORIA, AUSTRALIA.

ELECTRIC PROCESS FOR THAWING CARCASSES OF FROZEN MEAT AND THE LIKE.

Application filed May 13, 1919. Serial No. 296,850.

*To all whom it may concern:*

Be it known that I, ALFRED UPTON ALCOCK, a British subject, residing at No. 31 Queen Street, Melbourne, in the State of Victoria, Commonwealth of Australia, have invented new and useful Improvements in an Electric Process for Thawing Carcasses of Frozen Meat and the like, of which the following is a specification.

This invention relates to treatment for thawing frozen meat and has for its object the utilization of the thermal or heating effect of electricity for such purpose, the electric current being passed through the frozen meat or carcass thereof to gradually raise its temperature to bring it to its normal state, and which can be accomplished in about twenty-four hours for beef, whereas it takes about sixty hours by present methods, and can be accomplished in about eight hours for mutton, whereas it takes about twenty hours by present methods. The invention is applicable to whole carcasses although it can be applied to any suitable portions of such carcass, the term carcass being hereinafter used to designate both cases.

According to the invention an electric current from any suitable source is established through a carcass between electrodes arranged and always inserted in the flesh at oppositely disposed points or parts thereof, and such that the electrical resistance offered shall cause a rise in temperature necessary for thawing.

Ordinarily the temperature is raised to the normal and the material of the carcass itself constitutes the resistance the current being transmitted by inserting electrodes of steel or suitable metal or material into the flesh one at each extremity of a carcass to be treated.

The carcass either by itself or with others can be located in an open or closed chamber and the source of current and electrodes connected thereto can be such that a number of carcasses can be simultaneously treated, the several carcasses being connected in parallel or series or a combination of the two.

Supplementary resistance, although not essential, can be applied to a carcass if desired.

The invention will now be fully described aided by reference to the accompanying drawings, in which—

Fig. 1 is a longitudinal section of a chamber installed in accordance with my invention to accommodate the ordinary means of hanging meat on overhead rails the chamber being partly broken away at one end and Fig. 2 a sectional plan of same taken at line $a$—$a$, Fig. 1 illustrating the arrangement of conductors for the installation of a complete system, while Fig. 3 is a transverse section taken on line $b$—$b$ Figs. 1 and 2 and illustrating the means of taking the electric connections to a carcass or carcasses from overhead conductors.

Fig. 4 is a side view of a single point electrode and which may be either solid or hollow.

Fig. 5 is a plan, and

Fig. 6 a side view of a multiple point electrode having an inward thrust.

Fig. 7 is a side view.

Fig. 8 a front view and

Fig. 9 a sectional plan of a double hook electrode.

Fig. 10 is a plan and

Fig. 11 is part side view of a multiple point electrode with spring designed to give outward thrust.

Figure 1:
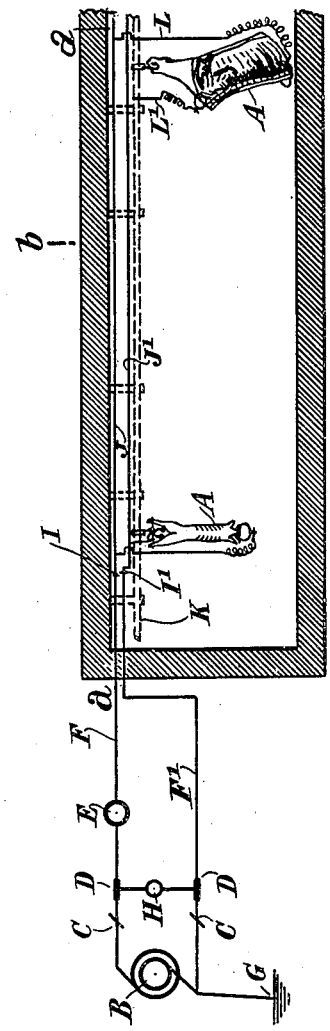
Figure 2:
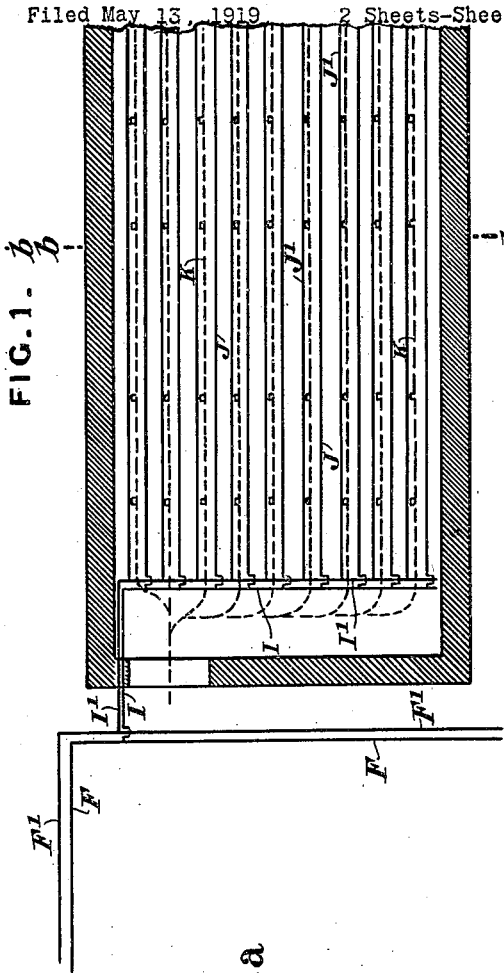
Figure 3:

In installing my invention in a chamber such as shewn in Figs. 1, 2 and 3 designed to have a number of rows of frozen meat carcasses A suspended therein with the object of rapidly thawing or defrosting them, the electricity is generated by alternating current or by a direct current dynamo B, and passed through double pole switch C—C, double pole fuse D—D and ammeter E which is inserted in the line wire F of circuit. The other wire $F^1$ of circuit being earthed at G and a voltmeter H is provided and shown across fuses D—D.

Line wire F leads from the generator to a bus-bar I in the chamber or room and from said bus-bar conductors J are taken off as required. Line wire $F^1$ is taken from the generator to bus-bar $I^1$ and from which latter conductors $J^1$ are taken off to connect the rails K from which the meat is hung. These rails which are shewn mainly by dotted lines are insulated from the building, while the conductors J and $J^1$ have connecting wires L and L¹ respectively attached to them which latter are in turn connected to any of the various electrodes, such as are illustrated in Figs. 4 to 11 and hereinafter described.

Referring to the electrode M shewn in Fig. 4, it is designed in the form of a spike and to insure a good contact when inserted in the carcass, it is necessary to drive it in, but such can be facilitated by boring a hole of smaller diameter than the electrode where it is to be inserted. This electrode may either be solid metal, preferably stainless steel, or it may be hollow and filled with water or suitable liquid to absorb any local heat generated in the carcass in or around the electrode.

The electrode N shown in Figs. 5 and 6 is n the form of an outwardly insulated spring band having multiple point electrodes N¹ and designed by the resilient power of the spring band to clip or automatically force the points into the meat as it thaws to ensure good contact and thus avoid the burning or singeing of the meat which occurs if contacts are loose. The spring of this terminal is designed to give an inward thrust.

Figs. 7, 8 and 9 illustrate a suspension electrode O in the form of a double swivel hook which clips on the meat rail at O¹ and the carcass is suspended by the hooks O² thus ensuring good contact which is necessary between the electrode and the meat.

Figs. 10 and 11 illustrate an outward thrust multiple point electrode P in which the insulated spring band is designed to give an outward thrust to the electrode points P¹ for the purpose already described.

In carrying out the invention the electric current at a suitable voltage is applied to the carcasses by means of steel or other suitable metal or material electrodes, which are clipped on or driven into the carcass in such a manner that the electrode or electrodes of one pole of the source of electric supply s or are inserted in the flesh at one extremity of the carcass and the electrode or electrodes of the other pole of the source of electric supply are also inserted in the flesh at the other extremity of the carcass in such a manner as to cause the flow of electricity through the carcass between the opposite poles or electrodes to be evenly distributed, and thus produce a uniform thawing of all parts of the meat. To facilitate uniformity of thawing, portions of the carcass may be shunted with suitable resistance connected to the part or parts through medium of steel or other suitable metal electrodes attached to the resistance coil employed.

To automatically control the quantity of electricity required to reach the necessary degree to which the temperature is to be raised, the circuit in which the carcass is contained is controlled either by choke coil, thermal cut-out or by an electric-magnetic cut-out, or by a time switch.

The process may be operated in ordinary atmospheric temperature, or in any class of chamber in combination with or without air circulation preferably with dry air chemically or mechanically treated, or subjected to air pressure or in vacuo.

To prevent local heating by or of the electrodes with high density current means may be provided for cooling same, and may be done either chemically or mechanically.

Thawing out may be done by either direct current or single or multiphase alternating current of low or high frequency at any suitable voltage.

Having now described my invention what I claim as new and desire to secure by Letters Patent is:—

1. The herein described method of thawing frozen carcasses which consists in subjecting the same to the thermal effect of an electric current whereby each carcass forms part of an electric circuit and is adapted to offer sufficient resistance to said current to raise the temperature of the carcass to normal, substantially as and for the purpose described.

2. The herein described method of thawing frozen carcasses or parts thereof, which consists in inserting therein at different points metal electrodes in the form of hollow spikes containing a heat-absorbing liquid, connecting said electrodes in circuit with a source of electric supply, and passing an electric current through said circuit and the frozen meat.

3. The herein described method of thawing frozen carcasses or parts thereof, which consists in inserting therein at different points metal electrodes in the form of hollow spikes containing a heat-absorbing liquid, suspending the same in a closed air chamber, connecting said electrodes in circuit with a source of electric supply, and passing an electric current through said circuit and the frozen meat.

In testimony whereof I have signed my name to this specification in the presence of two subscribing witnesses.

ALFRED UPTON ALCOCK.

Witnesses:
 BEDLINGTON BODYCOMB,
 LESLIE LAWTON BEAR.